US007602165B2

(12) United States Patent
Watanabe et al.

(10) Patent No.: US 7,602,165 B2
(45) Date of Patent: Oct. 13, 2009

(54) PHASE CONTROL DEVICE FOR DC/DC CONVERTER

(75) Inventors: Yasuto Watanabe, Wako (JP); Mitsuaki Hirakawa, Wako (JP); Keigo Andou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 11/882,997

(22) Filed: Aug. 8, 2007

(65) Prior Publication Data

US 2008/0036435 A1 Feb. 14, 2008

(30) Foreign Application Priority Data

Aug. 8, 2006 (JP) ............... P2006-216119

(51) Int. Cl.
*G05F 1/40* (2006.01)
(52) U.S. Cl. .............. 323/282; 323/272; 363/16
(58) Field of Classification Search ............. 323/262, 323/266, 272, 274, 282–288, 222; 363/16–20, 363/127, 131, 40
See application file for complete search history.

(56) References Cited

U.S. PATENT DOCUMENTS

| 4,257,087 A | * | 3/1981 | Cuk ................ 363/16 |
| 4,384,321 A | | 5/1983 | Rippel |
| 4,959,764 A | * | 9/1990 | Bassett .............. 363/16 |
| 5,247,239 A | * | 9/1993 | Yamamura et al. ...... 323/272 |
| 5,861,734 A | | 1/1999 | Fasullo et al. |
| 5,929,614 A | * | 7/1999 | Copple ............... 323/222 |
| 5,949,213 A | * | 9/1999 | Lanni ................ 320/106 |
| 6,806,689 B2 | * | 10/2004 | Schuellein et al. ...... 323/272 |
| 7,502,240 B2 | * | 3/2009 | Leung et al. ........... 363/72 |

FOREIGN PATENT DOCUMENTS

| JP | 2003-111390 A | 4/2003 |
| JP | 2003-216255 A | 7/2003 |
| JP | 2006-149054 | 6/2006 |

* cited by examiner

*Primary Examiner*—Rajnikant B Patel
(74) *Attorney, Agent, or Firm*—Birch, Stewart, Kolasch & Birch, LLP

(57) ABSTRACT

A phase control device for use with a voltage-boosting DC/DC converter includes a current sensor for detecting a current flowing through at least one of the primary and secondary windings of a transformer of the DC/DC converter, a ripple determining section for, on the basis of a current signal detected by the current sensor, determining an amount of current ripple occurring when a first switching element or second switching element switches to an ON state, and a phase regulating section for, on the basis of the amount of current ripple determined by the ripple determining section, regulating a phase related to an ON time of each of the first and second switching elements such that the amount of current ripple is reduced to zero.

20 Claims, 7 Drawing Sheets

ENERGIZATION OF PRIMARY WINDING L1

ENERGIZATION OF SECONDARY WINDING L2

PHASE CONTROL DEVICE FOR DC/DC CONVERTER

FIELD OF THE INVENTION

The present invention relates to a phase control device for a DC/DC (digital-to-digital) converter particularly suitable for use in a power supply of an electric vehicle, and also to a program embodied in a computer readable medium for use in phase control of a DC/DC converter.

BACKGROUND OF THE INVENTION

Various types of voltage-boosting DC/DC converters are known as disclosed, for example, in Japanese Patent Laid-Open Publications (JP-A) Nos. 2003-111390, 2003-216255 and 2006-149054.

As shown in FIG. 13 hereof, the voltage-boosting DC/DC converter disclosed in JP 2006-149054A generally comprises an input-side smoothing capacitor C1, an inductor L0, a primary winding L1, a secondary winding L2, four switching elements SW1, SW2, SW3 and SW4, and an output-side smoothing capacitor C2.

The input-side smoothing capacitor C1 is connected between a common reference terminal 11 and an input terminal 12, while the output-side smoothing capacitor C2 is connected between the common reference terminal 11 and an output terminal 13.

The primary winding L1 and the secondary winding L2 form an essential part of a transformer T1. The transformer T1 includes a single core (ferrite core, iron core or the like) F1 on which the primary winding L1 and the secondary winding L2 are wound with opposite winding directions and connected together in an oppositely-wound configuration. The winding ratio between the primary winding L1 and the secondary winding L2 is preferably 1:1.

The switching elements SW1 to SW4 are each in the form of, for example, an IGBT (Insulated Gate Bipolar Transistor) capable of conducting a high current and withstanding a high voltage. Each of the switching elements SW1 to SW4 has a collector, emitter and gate. Further, a diode D3 is connected in parallel between the collector and emitter of each of the switching elements SW1-SW4 in a forward direction from the emitter toward the collector.

The inductor L0 is connected at one end to the input terminal 12, which forms an upper terminal of the input-side smoothing capacitor C1. The other end of the inductor L0 is connected to a common terminal "c" of the primary and secondary windings L1 and L2 of the transformer T1. Two T-match circuits are connected in parallel between the other end of the inductor L0 and the output terminal 13. The parallel T-match circuits comprise a first T-match circuit including the primary winding L1 of the transformer T1 and switching elements SW1 and SW3, and a second T-match circuit including the secondary winding L2 of the transformer T1 and switching elements SW2 and SW4.

In the first T-match circuit, a point between the collector and emitter of the switching element SW1 is connected between a terminal "a" of the primary winding L1 and the common reference terminal 11, and a point between the collector and emitter of the switching element SW3 is connected between the terminal "a" and the output terminal 13. Further, in the second T-match circuit, a point between the collector and emitter of the switching element SW2 is connected between a terminal "b" of the secondary winding L2 and the common reference terminal 11, and a point between the collector and emitter of the switching element SW4 is connected between the terminal "b" and the output terminal 13. Gate signals SG1 and SG2 for controlling ON/OFF action of the two switching elements SW1 and SW2 are supplied from a control device or controller (not shown) to the respective gates G1 and G2 of the switching elements SW1 and SW2. Similarly, gate signals for controlling ON/OFF action of the remaining switching elements SW3 and SW4 are also supplied from the non-illustrated controller to the respective gates of the switching elements SW3 and SW4. In the circuit configuration shown in FIG. 13, however, the switching elements SW3 and SW4 are kept in an OFF state. In this instance, when current flows from the terminal "a" or the terminal "b" toward the output terminal 13, the diode D3 of the corresponding switching element SW3 or SW4 allows the current to flow therethrough to the output terminal 13.

FIG. 14 collectively shows the ON/OFF action of the switching elements SW1 and SW2 occurring in response to the gate signals SG1 and SG2 applied respectively thereto, waveforms of currents I1 and I2 flowing through the primary and secondary windings L1 and L2, respectively, according to the ON/OFF action of the switching elements SW1 and SW2, and the waveform of an ideal current I3 flowing through the primary and secondary windings L1 and L2.

In the voltage-boosting DC/DC converter 10 shown in FIG. 13, when the switching element SW1 is turned on, an exciting current I1 flows through the primary winding L1 of the transformer T1. As the exciting current I1 flows through the primary winding L1, an excited current (induced current) I2 is produced in the secondary winding L2 on the basis of the mutual induction action. Alternatively, when the switching element SW2 is turned on, an exciting current I2 flows through the secondary winding L2 of the transformer T1. As the exciting current I2 flows through the secondary winding L2, an excited current (induced current) is produced in the primary winding L1 on the basis of the mutual induction.

The two switching elements SW1 and SW2 are designed to perform switching operation such that, as shown in FIG. 14, the timing of switching action of one switching element occurring in response to one of the two gate signals of different phases is the same as the timing of switching action of another switching element. The switching actions of the switching elements SW1 and SW2 have the same time period A, B corresponding to unit waveforms of the currents I1 and I2 flowing through the primary and secondary windings L1 and L2. The switching elements SW1 and SW2 have the same ON time C, D.

In the conventional DC/DC converter 10, the current flowing through the primary winding L1 of the transformer T1 and the current flowing through the secondary winding L2 ideally have a waveform (ideal current waveform) I3, which is continuous in regions 15 occurring repeatedly at switching of mutual energization of the primary and secondary windings L1 and L2. In practice, however, due to a difference in inductance of the primary and secondary windings L1 and L2, or a difference in ON/OFF characteristic of the switching elements SW1 and SW2, switching of mutual energization of the primary and secondary windings L1 and L2 produces a current difference, which creates an abrupt change (or stepped portion) in each of regions 16 of the waveforms of the currents I1 and I2. The region 15 in the ideal current waveform I3 and the region 16 of the waveforms of actual currents I1 and I2 are shown on enlarged scale in FIGS. 15A and 15B, respectively.

The abrupt change (stepped portion) 16 occurring in the regions 16 of the waveforms of the currents I1 and I2 increases current ripple in the transformer T1, which may sometimes be 5 or more times as large as the ideal current waveform I3. With this increase in the current ripple, iron loss of the transformer T1 increases, resulting in undue temperature rise and efficiency reduction of the transformer T1. In some cases, the transformer T1 undergoes magnetic saturation. At the stepped portion 16a (FIG. 15B) of the waveforms of the currents I1 and I2, a harmonic component is involved, which causes the transformer T1 to generate unpleasant vibration noises. Further, an increased current ripple gives a negative influence on currents flowing through the switching elements SW1 and SW2 so that the diodes D3 associated with the switching elements SW1 to SW4 are subjected to an increased peak current. This may require use of switching elements of higher capacity capable of providing an increased current rating (withstanding current).

With the foregoing drawbacks in view, the present invention seeks to provide a phase control device and a phase control program, which are capable of suppressing creation of an unnecessary abrupt change (stepped portion) in waveforms of currents flowing in the primary and secondary windings of a transformer of a DC/DC converter.

SUMMARY OF THE INVENTION

According to a first aspect of the present invention, there is provided a phase control device for use with a voltage-boosting DC/DC converter including a low-voltage-side port and a high-voltage-side port, the DC/DC converter further including a transformer of a magnetic-field cancellation type having a primary winding and secondary winding interconnected in an oppositely-wound configuration with a common terminal of the primary winding and secondary winding being connected to a positive-pole terminal of the low-voltage-side port, first switching means for controlling an energizing current of the primary winding which flows to a common reference terminal, and second switching means for controlling an energizing current of the secondary winding which flows to the common reference terminal, the phase control device comprising: current detecting means for detecting a current flowing through at least one of the primary and secondary windings; determining means for, on the basis of a current signal detected by the current detecting means, determining an amount of current ripple occurring when the first switching means or the second switching means switches to an ON state; and phase regulating means for, on the basis of the amount of current ripple determined by the determining means, regulating a phase related to an ON time of each of the first and second switching means such that the amount of current ripple is reduced to zero.

By thus regulating the phase related to the ON time of each switching means, it is possible to suppress generation of waveform discontinuity of the currents flowing through the primary and secondary windings of the transformer. Since the currents flowing through the primary and secondary windings are substantially free from ripple, the transformer can operate silently without generating unpleasant vibration noise. The ripple-free currents can obviate the need for switching elements of higher capacities.

According to a second aspect of the present invention, there is provided a program embodied in a computer readable medium for use in phase control of a voltage-boosting DC/DC converter including a low-voltage-side port and a high-voltage-side port, the DC/DC converter further including a transformer of a magnetic-field cancellation type having a primary winding and secondary winding interconnected in an oppositely-wound configuration with a common terminal of the primary winding and secondary winding being connected to a positive-pole terminal of the low-voltage-side port, first switching means for controlling an energizing current of the primary winding which flows to a common reference terminal, second switching means for controlling an energizing current of the secondary winding which flows to the common reference terminal, the program comprising, and current detecting means for detecting a current flowing through at least one of the primary and secondary windings, the program comprising: a determining function to, on the basis of a current signal detected by the current detecting means, determine an amount of current ripple occurring when the first switching means or the second switching means switches to an ON state; and a phase regulating function to, on the basis of the amount of current ripple determined by the determining function, regulating a phase related to an ON time of each of the first and second switching means such that the amount of current ripple is reduced to zero.

BRIEF DESCRIPTION OF THE ACCOMPANYING DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
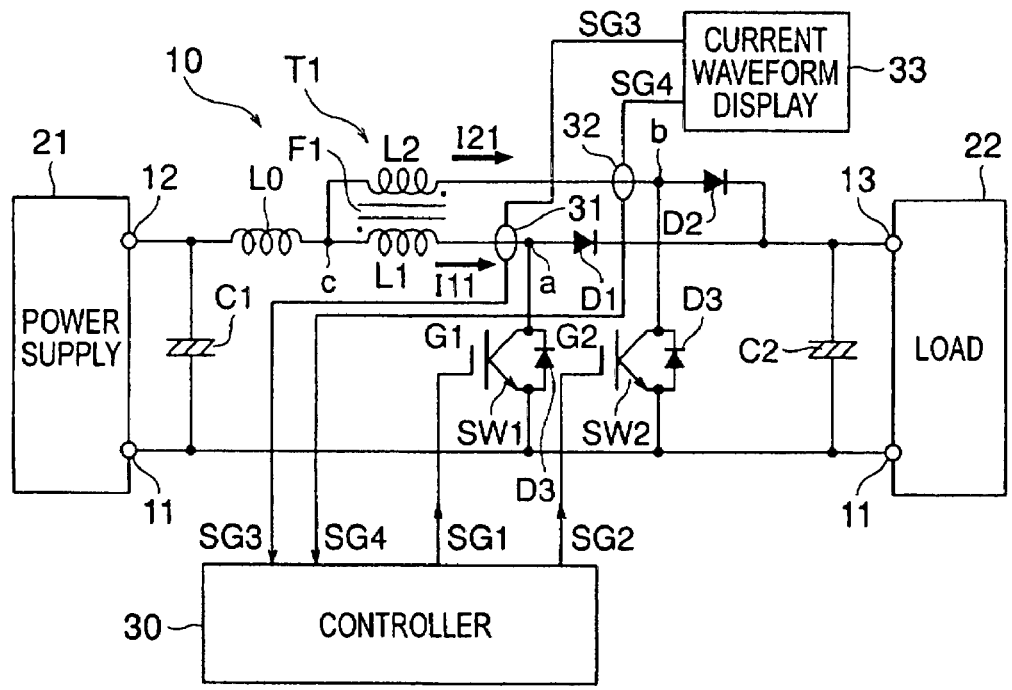
FIG. 1 is an electric circuit diagram showing a DC/DC converter and a phase control device used therewith according to an embodiment of the present invention.
Figure 13:
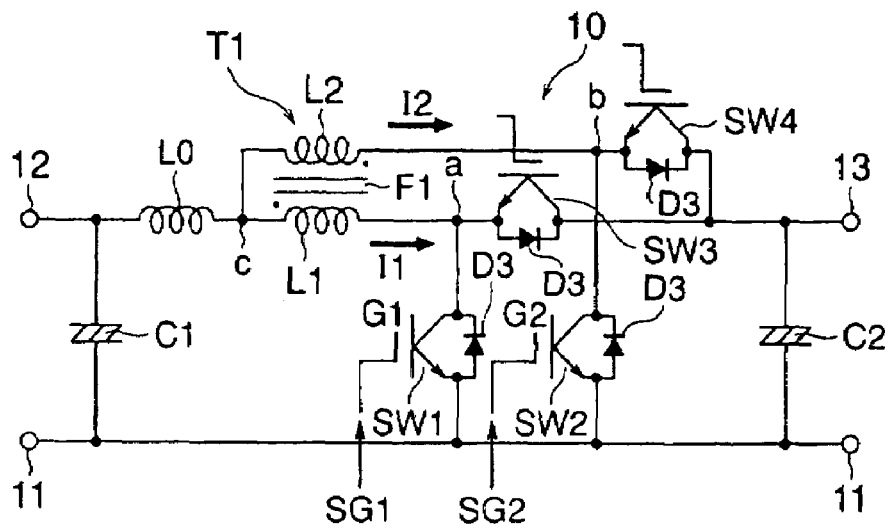
FIG. 13 is an electric circuit diagram showing a conventional DC/DC converter.
Figure 14:
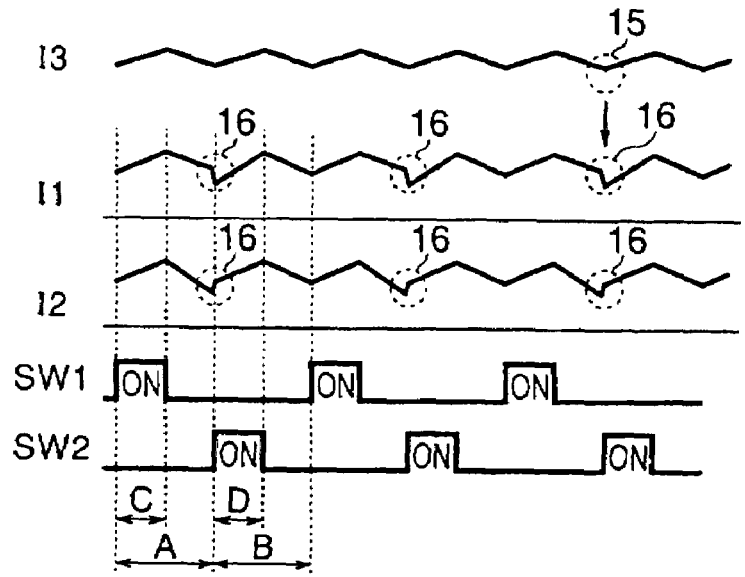
FIG. 14 is a view showing waveforms of various component parts explanatory of operation of the conventional DC/DC converter.
Figure 15A:
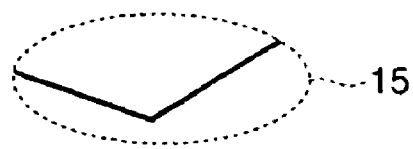
FIG. 15A is an enlarged view of a portion of FIG. 14.
Figure 15B:
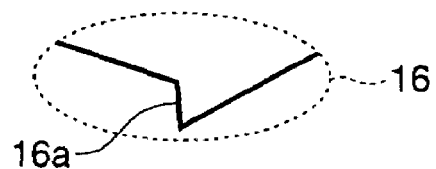
FIG. 15B is an enlarged view of another portion of FIG. 14.

With reference to FIGS. 1 to 4, a description will be made as to an embodiment of a phase control device for a DC/DC converter according to the present invention. The DC/DC converter 10 shown in FIG. 1 can be used as a voltage-boosting DC/DC converter (electric power converter) embodied in an electric system of an electric vehicle (not shown). The phase control device or controller 30 shown in FIG. 1 is designed to control switching elements SW1 and SW2 in an appropriate manner so as to suppress ripple current in the circuitry. In terms of fundamental configuration, the DC/DC converter 10 shown in FIG. 1 is substantially the same as the conventional DC/DC converter shown in FIG. 13.

In FIG. 1, the DC/DC converter 10 is shown as dual-port circuitry (four-terminal circuitry). In the case where the DC/DC converter 10 should operate as a voltage-boosting DC/DC converter, the left-side port functions as a low-voltage-side input port, while the right-side port functions as a high-voltage-side output port.

Here, the general configuration of the DC/DC converter 10 will be described again. The DC/DC converter 10 comprises an input-side smoothing capacitor C1, an inductor L0, a transformer T1, switching elements SW1 and SW2, and an output-side smoothing capacitor C2. The inductor L0 may be omitted.

The input-side smoothing capacitor C1 is connected between a common reference terminal (earth or ground terminal) 11 and an input terminal 12, while the output-side smoothing capacitor C2 is connected between the common reference terminal 11 and an output terminal 13. The transformer T1 is formed by a core F1, a primary winding L1 and a secondary winding L2. The primary winding L1 and the secondary winding L2 are wound with opposite winding directions and connected together in an oppositely-wound configuration. The winding ratio between the primary winding L1 and the secondary winding L2 is preferably 1:1.

In the DC/DC converter 10, the primary and secondary windings L1 and L2 that are wound on the core F1 of the transformer T1 are so arranged as to form a magnetic-field cancellation structure in which magnetic fluxes produced by the primary and secondary windings L1 and L2 cancel each other. With this magnetic-field cancellation structure, the core F1 of the transformer T1 can be prevented from magnetically saturating easily and does not have to provide a gap. This allows use of a small-sized core, which will contribute to reduction in size and weight of the transformer T1. Furthermore, the inductor L0 is provided to ensure boosting of the input voltage to a desired level within a range of one to two times the input voltage and to realize a function of continuous variability rather than a high voltage-boosting function. Accordingly, as compared to a circuit arrangement so configured as to perform a voltage-boosting operation only by means of an inductor L0 without using a transformer T1, the DC/DC converter 10 of the present invention allows for a small-sized inductor used as the inductor L0.

Each of the switching elements SW1 and SW2 has a collector, emitter and gate. Further, a diode D3 is connected in parallel between the collector and emitter of each of the switching elements SW1 and SW2 in a forward direction from the emitter toward the collector.

The inductor L0 is connected at one end to the input terminal 12, which forms an upper terminal of the input-side smoothing capacitor C1. The other end of the inductor L0 is connected to a common terminal "c" of the primary and secondary windings L1 and L2 of the transformer T1. Two T-match circuits are connected in parallel between the other end of the inductor L0 and the output terminal 13. The parallel T-match circuits comprise a first T-match circuit including the primary winding L1 of the transformer T1, the switching element SW1 and a diode D1, and a second T-match circuit including the secondary winding L2 of the transformer T1, the switching element SW2 and a diode D2.

In the first T-match circuit, a point between the collector and emitter of the switching element SW1 is connected between a terminal "a" of the primary winding L1 and the common reference terminal 11, and the diode D1 is connected between the terminal "a" and the output terminal 13. Further, in the second T-match circuit, a point between the collector and emitter of the switching element SW2 is connected between a terminal "b" of the secondary winding L2 and the common reference terminal 11, and the diode D2 is connected between the terminal "b" and the output terminal 13. Gate signals SG1 and SG2 for controlling ON/OFF action of the switching elements SW1 and SW2 are supplied from the phase control device or controller 30 to the respective gates G1 and G2 of the switching elements SW1 and SW2.

A power supply 21 is connected to the common reference terminal 11 and the input terminal 12, and a load 22 is connected to the common reference terminal 11 and the output terminal 13.

The phase control device or controller 30 is provided to perform phase control of an output current of the DC/DC converter 10. To this end, the phase controller 30 supplies gate signals SG1 and SG" to the switching elements SW1 and SW2. In response to the gate signals SG1, SG2, the phase control is performed on the output current from the transformer T1. When the present invention is embodied in an electric system of an electric vehicle, the phase controller 30 shown in FIG. 1 may be incorporated in an electronic control unit (ECU). The phase controller 30 receives state-detection signals from various component parts contained in the electric system and supplies control signals to the same component parts. For instance, the phase controller 30 receives from a main battery signals related to battery information (voltage, current, temperature of the main battery) and supplies control signal (gate signals SG1 and SG2) to the DC/DC converter.

As shown in FIG. 1, two current sensors (current detecting means) 31 and 32 are associated with the primary winding L1 and the secondary winding L2, respectively, of the transformer T1. The current sensor 31 is disposed between the primary winding L1 and the diode D1, while the current sensor 32 is disposed between the second winding L2 and the diode D2. Detection signals SG3, SG4 from the current sensors 31, 32 are input into the phase controller 30. The detection signals SG3, SG4 are also supplied to a current waveform display 33. The current waveform display 33 is configured to receive and display the gate signals SG1, SG2.

Figure 2:
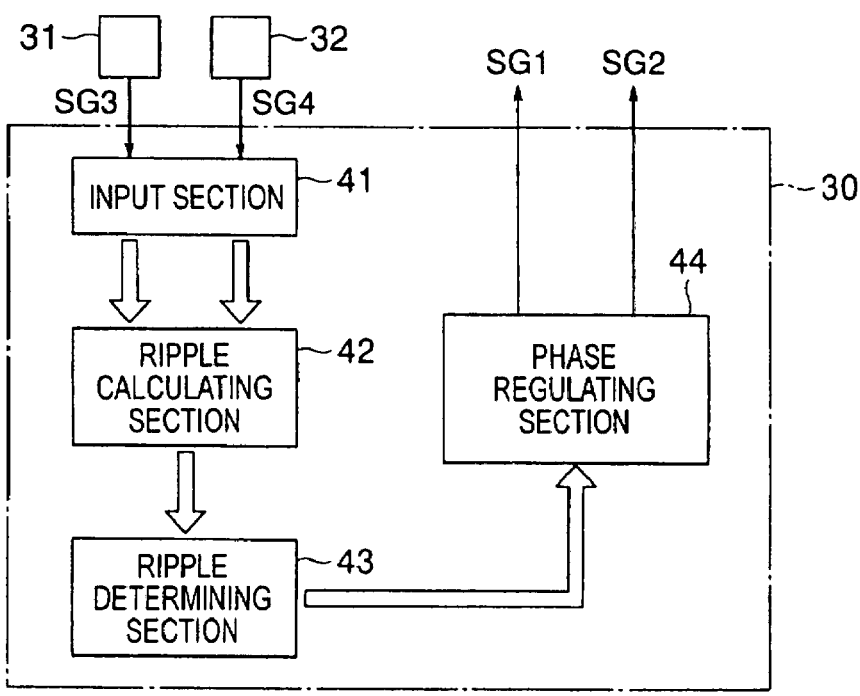
FIG. 2 is a block diagram showing a general configuration of the phase control device.

FIG. 2 shows a general configuration of the phase controller 30. The phase controller 30 is in the form of a computer and includes functional sections that can be realized by way of software processing using a computer program embodied in a computer readable medium for use in phase control of the DC/DC converter 10. The functional sections of the phase controller 30 may be partly or entirely formed by hardware. The phase controller 30 includes an input section 41, which receives detection signals (analog signals) SG3, SG4 from the respective current sensors 31, 32. At the input section 41, the detection signals SG3, SG4 are current-regulated, then translated into digital detection signals, and finally input into a ripple calculating section 42.

The ripple calculating section 42 calculates an amount of change in current value (i.e., current ripple) occurring at the stepped portions of the waveform of each of the detection signals SG3, SG4 that have been detected by the current sensors 31, 32. A signal output from the ripple calculating section 42 as representing a calculated amount of current ripple is delivered into the ripple determining section 43.

The ripple determining section 43 judges, through ranking, for example, the level of current ripple occurring when the switching element SW1 or the switching element SW1 switches to an ON state. A signal output from the ripple determining section 43 as representing judgment results is input into a phase regulating section 44.

Based on the judgment results, the phase regulating section 44 regulates the phase of currents I11, I21 flowing respectively through the primary winding L1 and the secondary winding L2, by controlling the respective ON times of the switching elements SW1 and SW2 in such a manner that the amount of current ripple output from the ripple calculating section 42 is reduced to zero. The regulation of ON/OFF actions of the switching elements SW1 and SW2, which is performed by the phase regulating section 44, is carried out by way of proper adjustment of the signal waveforms of the gate signals SG1 and SG2 supplied to the respective gates G1 and G2 of the switching elements SW1 and SW2 (i.e., ON/OFF timing of the switching elements SW1, SW2). The phase adjustment or regulation will be described in greater detail with reference to a typical example.

Although in the illustrated embodiment just described above the phase controller 30 is arranged to receive detection signals from the two current sensors 31, 32, it is possible according to the invention to employ another embodiment in which either one of the primary and secondary windings L1 and L2 of the transformer T1 is provided with a current sensor, and the phase controller 30 receives a detection signal from the single current sensor.

Operation of the DC/DC converter 10 will be described with reference to FIGS. 3 to 7. In the illustrated embodiment, the DC/DC converter 10 serves as a voltage-boosting power converter.

Figure 3:
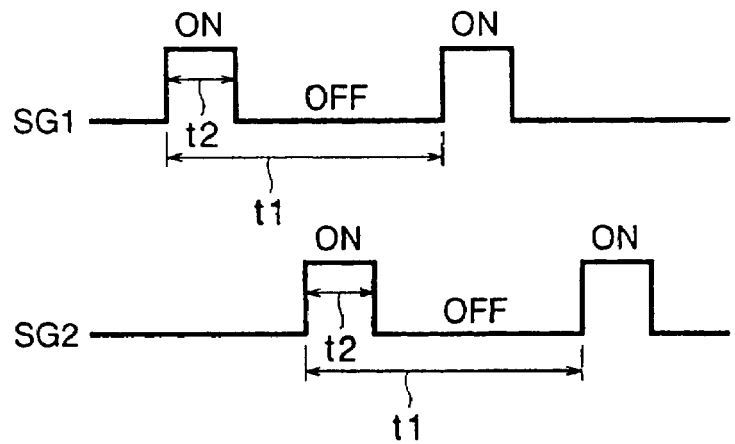
FIG. 3 is a view showing waveforms of gate signals used when the DC/DC converter performs a voltage-boosting operation.
Figure 4:
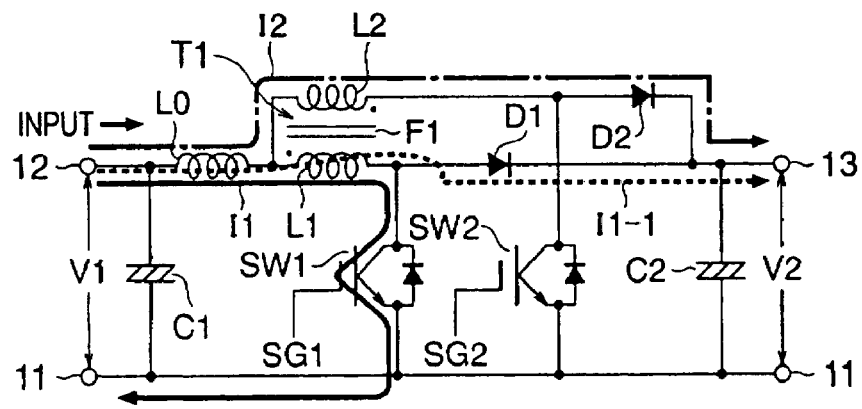
FIG. 4 is an electric circuit diagram explanatory of a first stage of the voltage-boosting operation of the DC/DC converter.

As shown in FIG. 3, the above-mentioned gate signals SG1 and SG2 are given to the respective gates of the switching elements SW1 and SW32 to turn on/off the switching elements SW1 and SW2. In the voltage-boosting DC/DC converter 10, the DC voltage V1 is applied as an input voltage as illustrated in FIG. 4. In the voltage-boosting operation, the DC voltage V1 input to the left-side input terminal 12 is converted so that the DC voltage V2 of a level equal to or greater than the input DC voltage V1 is output from the right-side output terminal 13. In the DC/DC converter 10, the voltage-boosting operation is performed in a forward direction from the left, low-voltage side toward the right, high-voltage side.

Signal waveforms of the gate signals SG1 and SG2 are shown in FIG. 3. The gate signals SG1 and SG2 are of pulse waveforms having the same period t1 and same duty cycle t2 and hence the same ON time, but these gate signals SG1 and SG2 are phase-shifted from each other so that the two switching elements SW1 and SW2 are not turned on simultaneously. The switching elements SW1 and SW2 alternately repeat ON/OFF action in response to such gate signals SG1 and SG2. The duty cycle t2, determining the ON time of the switching elements SW1 and SW2, is variable as necessary within a range not exceeding 50% so as to avoid the switching elements SW1 and SW2 from being turned on simultaneously. In this manner, the output voltage V2 can be increased or boosted from the level of the input voltage V1 within a range of one to two times the input voltage V1.

Figure 5:
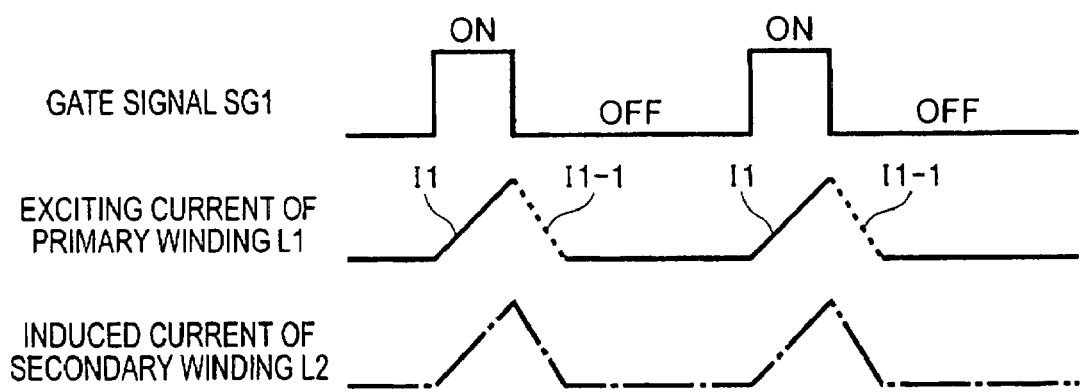
FIG. 5 is a view showing waveforms of a gate signal and energizing currents at the stage shown in FIG. 4.
Figure 6:
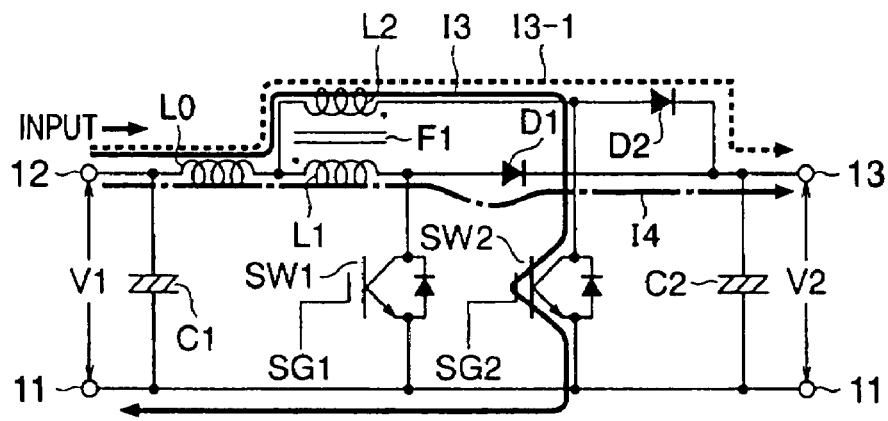
FIG. 6 is an electric circuit diagram explanatory of a second stage of the voltage-boosting operation of the DC/DC converter.

The voltage-boosting operation of the DC/DC converter 10 is described in greater detail with reference to FIGS. 4 to 7. FIG. 5 shows current flows in the individual circuit components of the DC/DC converter 10 when only the switching element SW1 is turned on to energize the primary winding L1 of the transformer T1. FIG. 6 shows current flows in the individual circuit components of the DC/DC converter 10 when only the switching element SW2 is turned on to energize the secondary winding L2 of the transformer T1.

In the DC/DC converter 10 shown in FIG. 4, the gate signal SG1 is supplied to the gate of the switching element SW1 to turn on/off the switching element SW1. As shown in FIG. 5, when the gate signal SG1 is in the ON state, the switching element SW1 is turned on. Because the DC voltage V1 has been input to the input terminal 12, an exciting current I1 flows through the primary winding L1 of the transformer T1 once the switching element SW1 is turned on. This exciting current I1 flows through a route of the input terminal 12, inductor L0, primary winding L1 and switching element SW1. While the gate signal SG1 is ON, the exiting current I1 gradually increases in level. Once the gate signal SG1 turns into the OFF state, the exciting current I1 decreases in level and ultimately reaches a zero level. Broken-line portions I1–1 of the exciting current I1 shown in FIG. 5 represent current portions that flow as a result of discharge of energy accumulated in the inductor L0 when the gate signal SG1 is turned off. The energizing current represented by the broken-line portion I1–1 decreases in level more slowly (i.e., taking a longer time) as the inductance of the inductor L0 is greater. This exciting current I1–1 flows, through the primary winding L1 and diode D1, to the output terminal 13.

As the exciting current I1 flows through the primary winding L1 of the transformer T1 as set forth above, an induced current (excited current) I2 is produced in the secondary winding L2 on the basis of the mutual induction action. The induced current I2 flows through the diode D2 to the output terminal 13. As shown in FIG. 5, the induced current I2 thus produced in the secondary winding L2 has variation characteristics substantially identical in shape to the exciting current I1 and also has similar level values to the exciting current I1 on the basis of the winding ratio (1:1). The smoothing capacitor C2 is charged with the induced current I2, as a result of which the DC voltage V2 is output to the output terminal 13 on the basis of the induced current I2.

Figure 7:
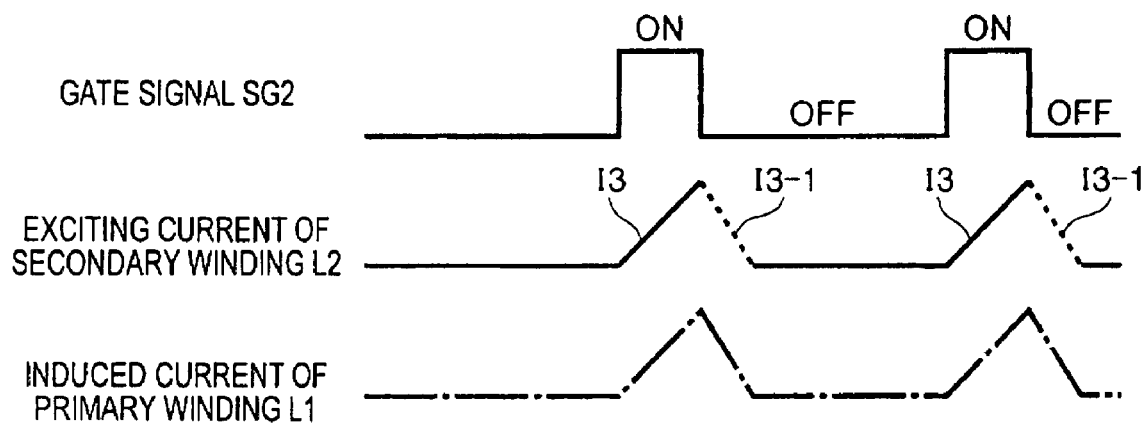
FIG. 7 is a view showing waveforms of another gate signal and energizing currents at the stage shown in FIG. 6.

Referring now to FIG. 6, the gate signal SG2 is supplied to the gate of the switching element SW2 to turn on/off the switching element SW2. The switching element SW2 is kept in the ON state while the gate signal SG2 is ON as illustrated in FIG. 7. The DC voltage V1 has been input to the input terminal 12, and thus, an exciting current I3 flows through the secondary winding L2 of the transformer T1 once the switching element SW2 is turned on. This exciting current I3 flows through a route of the input terminal 12, inductor L0, secondary winding L2 and switching element SW2. While the gate signal SG2 is ON, the exciting current I3 gradually increases in level. Once the gate signal SG2 turns into the OFF state, the exciting current I3 decreases in level and ultimately reaches the zero level. Broken-line portions I3–1 of the exciting current I3 shown in FIG. 7 represent current portions that flow as a result of discharge of energy accumulated in the inductor L0. The exciting current represented by the broken-line portion I3–1 decreases in level more slowly (i.e., taking a longer time) as the inductance of the inductor L0 is greater. This exciting current flows, through the secondary winding L2 and diode D2, to the output terminal 13.

As the exciting current I3 flows through the secondary winding L2 of the transformer T1 as set forth above, an induced current (excited current) I4 is produced in the primary winding L1 on the basis of the mutual induction action. As shown in FIG. 7, the induced current I4 thus produced in the primary winding L1 has variation characteristics substantially identical in shape to the exciting current I3 and also has similar level values to the exciting current I3 on the basis of the winding ratio (1:1). The smoothing capacitor C2 is charged with the induced current I4, as a result of which the DC voltage V2 is output to the output terminal 13 on the basis of the induced current I4.

As set forth above, the voltage-boosting operation of the DC/DC converter 10 is based on the magnetic-field-cancellation type circuit section (L1, L2 and F1). Namely, once the switching element SW1 is turned on while the switching element SW2 is turned off, an exciting current flows through the primary winding L1, and simultaneously an induced current (excited current) flows through the secondary winding L2 in such a direction as to cancel the magnetization of the core F1 and is then supplied to the output terminal 13. Further, once the switching element SW2 is turned on while the switching element SW1 is turned off, an exciting current flows through the secondary winding L2, and simultaneously an induced current (excited current) flows through the primary winding L1 in such a direction as to cancel the magnetization of the core F1 and is then supplied to the output terminal 13. Thus, the those currents flow through the primary and secondary windings L1 and L2 in opposite directions, so that the DC magnetization in the core F1 is canceled out and thus the core F1 can be prevented from magnetically saturating easily. Thus, even with smaller windings (coils) and core than the conventional counterparts, the embodiment of the DC/DC converter 10 can appropriately handle greater electric power. Namely, the above-described inventive arrangements can achieve a significant reduction in size (i.e., minitualization) of the DC/DC converter 10.

Further, with the inductor L0 added between the input terminal 12 and the common terminal c of the primary and secondary windings L1 and L2, the input voltage of the transformer T1 is continuously variable with the duty cycle t2 of the gate signals SG1 and SG2 according to the function of the inductor L0. As a consequence, the DC/DC converter 10 can boost the input voltage V1 to a desired level within a range of one to two times the input voltage V1 by varying the duty cycle t2 of the gate signals SG1 and SG2 within a range not exceeding 50%.

Next, with reference to FIGS. 8 to 11, a description will be given about various examples of phase adjustment or regulating operations, which are performed by the phase regulating section 44 (FIG. 2) of the phase controller 30.

Figure 8:
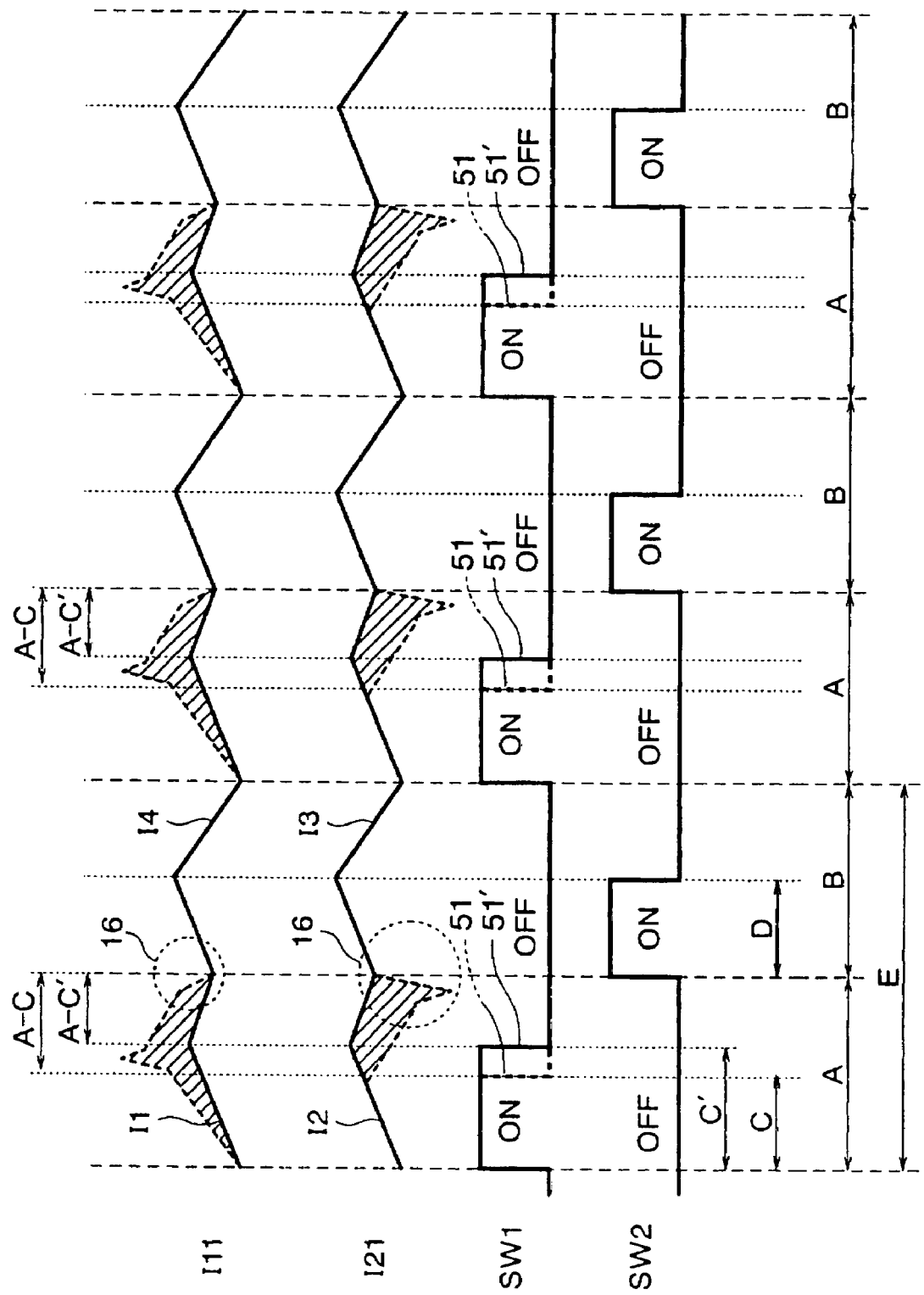
FIG. 8 is a view showing waveforms of various circuit components of the DC/DC converter for the purpose of illustrating operation of the DC/DC converter.

FIG. 8 shows the ON/OFF action of the switching elements SW1 and SW2 occurring in response to the gate signals SG1 and SG2 applied respectively thereto, and waveforms of currents I11 and I21 flowing through the primary and secondary windings L1 and L2, respectively, according to the ON/OFF action of the switching elements SW1 and SW2. In FIG. 8, the waveforms are shown diagrammatically for the purpose of illustration of an essential part of the present invention.

As for times (time periods) A, B, C, D and E shown in FIG. 8, "C" is an ON time of the switching element SW1, "D" is an ON time of the switching element SW2, "A" is a time period from the rise or leading edge of the ON time of the switching element SW1 to the rise or leading edge of the ON time of the switching element SW2, "B" is a time period from the rise or leading edge of the ON time of the switching element SW2 and the rise or leading edge of the ON time of the switching element SW1, and "E" is a switching cycle or period. "A" and "B" are alternate with each other and show a nature of two-phase time. When the phase controller 30 is not operating to offer a phase regulating function, it is usual that A=B, C=D, and A+B=E.

The current I11 flowing through the first winding L1 is composed of an exciting current I1 flowing during the time period A and an induced current (excited current) I4 flowing during the time period B. In correspondence to the alternating arrangement of the time periods A and B, the exciting current I1 and the induced current I4 flow alternately. Similarly, the current I21 flowing through the secondary winding L2 is composed of an induced current (excited current) I2 flowing during the time period A and an exciting current I3 flowing during the time period B. In correspondence to the alternating arrangement of the time periods A and B, the induced current I2 and the exciting current I3 flow alternately.

The waveforms of the currents I11 and I21 shown in FIG. 8 illustrate two different stages or conditions exhibited respectively before and after a phase adjustment or regulating operation is effected. In FIG. 8, broken lines show waveforms of the currents I11 and I21 before being subjected to the phase adjustment or regulating operation, and solid lines show waveforms of the current I11 and I21 provided after the phase adjustment or regulating operation. In the example shown in FIG. 8, the currents I11 and I21 involve discontinuity in waveform (stepped portions), as indicated by circles 16, occurring at the moment of turn-on action of the switching element SW2. The waveform discontinuity 16 is removed by the phase adjustment or regulating operation, which will be discussed later.

In the case where the currents I11 and I21 include current discontinuity 16, i.e., current ripple, the phase controller 30 performs a phase adjustment or regulating operation by controlling on-off operation of the switching elements SW1 and SW2 in such a manner as to reduce the current ripple to zero or a level smaller than the current level.

Figure 9:
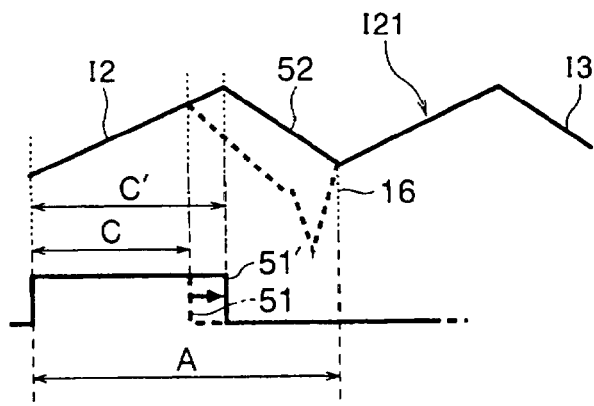
FIG. 9 is a waveform diagram explanatory of a first example of phase adjustment or regulating operation according to the present invention.

According to a first example of phase regulating operation, the relative ratio of the time C to the time A is increased while the times A, E and D are kept constant. As shown in FIG. 9, the ON time C of the switching element SW1 is varied to change the duty cycle of the waveform 51 (corresponding to the time C) during the time A.

Stated more specifically, as shown in FIG. 9, the ON time of the switching element SW1 is increased to C' where C'>C so that the switching waveform 51 varies to assume a waveform 51'. With this waveform variation, the exciting current I2 gradually increases in level until it assumes a waveform indicated by 52 shown in FIG. 19. The ON time C is adjusted in an appropriate manner while monitoring the current values detected by the current sensors 31, 32 so that the discontinuity in waveform between the current I2 and the current I3, which occurs at the leading edge of the ON time D of the switching element SW2, can be removed.

DC (direct current) component of the output current of the DC/DC converter 10 is constant. Accordingly, as the means value of DC component of the current I21 increases, the means value of DC component of the current I11 decreases conversely. Thus, waveform portions of the current I11 and waveform portions hatching of the current I21, that are indicated by hatching as shown in FIG. 8, have the same area. This means that phase control performed in such a manner as to remove the discontinuity in waveform (stepped portions 16) of the current I21 will automatically remove the waveform discontinuity (stepped portions 16) of the current I11. By thus removing the waveform discontinuities (stepped portions 16), the currents I11 and I21 have waveforms, which are stable as indicated by solid lines shown in FIG. 8.

The foregoing adjustment of the ON time C effected to remove the waveform discontinuity (stepped portions 16) of the current I21 may be replaced by an adjustment of the ON time C effected in order to remove the waveform discontinuity (stepped portions 16) of the current I11. In this instance, the same advantageous effect as discussed above can be attained too.

As thus far described, according to the first example of phase adjustment or regulating operation, the times A, E and D are kept constant and while keeping this condition, the gate signal SG1 given to the switching element SW1 is adjusted to increase the ON time C of the switching element SW1 in such a manner that current ripple contained in the currents I11 and I21 is reduced to zero or minimized.

Next, other examples of the phase adjustment or regulating operation will be described. In the examples described below, the relative ratio of the time C to the time A is increased without requiring the times A and E to be kept constant. According to a second example of the phase adjustment or regulating operation, the time C is increased while a part (A-C) of the time A excluding the time C is kept unchanged. In a third example of the phase adjustment or regulating operation, a part (A-C) of the time A, which is exclusive of the time C, is decreased. Yet, according to a fourth example of the phase adjustment or regulating operation, the phase adjustment as done in the second example and the phase adjustment as done in the third example are effected in combination. In the second example, the time A becomes longer than the time B. In the third embodiment, the time A becomes relatively short compared to the time B.

The second example of the phase adjustment or regulating operation will be described in greater detail with reference to FIG. 10. In this example, the phase adjustment of the current I21 is effected such that the time C is increased to C' to thereby increase the times A and E to A' and E', respectively. The amount of variation (increase in length) is the same for the times A, C and E. By thus increasing the times A, C and E, the induced current (excited current) 12 now has a prolonged duration which is long enough to ensure joining of the induced current I2 and the next following exciting current I3. The discontinuity in waveform (stepped portions 16) of the current I21 can thus be removed. The control is performed such that the current ripple (stepped portions 16) involved in the current I21 is minimized. The same control is performed on the current I11 to remove the discontinuity in waveform (stepped portion 16) of the current I11.

As thus far described, according to the second example of phase adjustment or regulating operation, the times B and D are kept unchanged and while keeping this condition, the gate signal SG1 given to the switching element SW1 is adjusted to vary the ON time C of the switching element SW1 and the times A and E in such a manner that current ripple contained in the currents I11 and I21 is reduced to zero or minimized.

Figure 10:
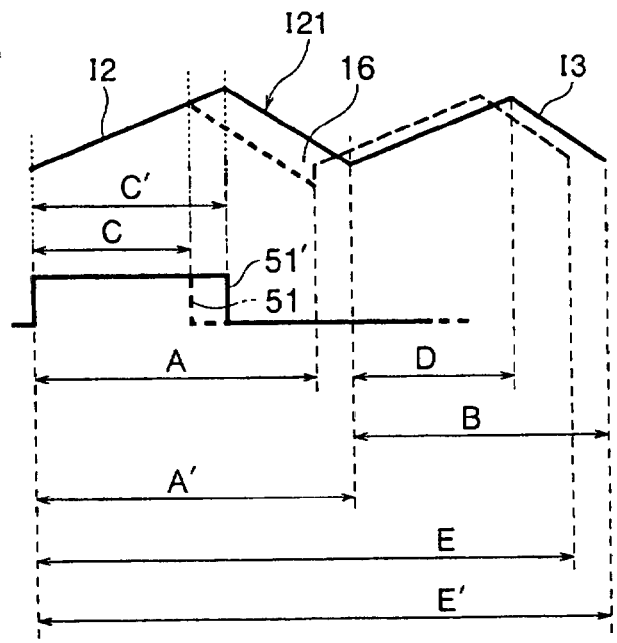
FIG. 10 is a waveform diagram illustrative of a second example of phase adjustment operation according to the invention.

In the examples shown in FIGS. 9 and 10, the undesired current discontinuity occurs at a time the switching element SW2 is turned on. In the case where the undesired current discontinuity occurs when the switching element SW1 is turned on, the ON time D and other time-dependent factors of the switching element SW2 will be varied to perform phase adjustment or regulating operation. It will be readily appreciated that the phase adjustment operation effected in connection with the switching element SW2 may have four variations (fifth to eighth examples) corresponding to the aforementioned first to fourth examples. Furthermore, when the undesired current discontinuity occurs at the moment of turn-on action of each of the two switching elements SW1 and SW2, one of the first to fourth examples of phase adjustment operation may be combined with one of the fifth to eighth examples of the phase adjustment operation.

The current waveform display 33 shown in FIG. 1 is designed to concurrently display waveforms of the two currents I11 and I21, for example. It is therefore possible to compare a pre-adjustment condition in which the currents I11, I21 have not been subjected to phase adjustment operation, and a post-adjustment condition in which the phase adjustment operation has already effected on the currents I11, I21. Further, it is possible for a human operator to perform fine adjustment of the ON/OFF action of the switching elements SW1 and SW2 while observing waveforms of the currents I11 and I21 shown on the current waveform display 33.

Figure 11:
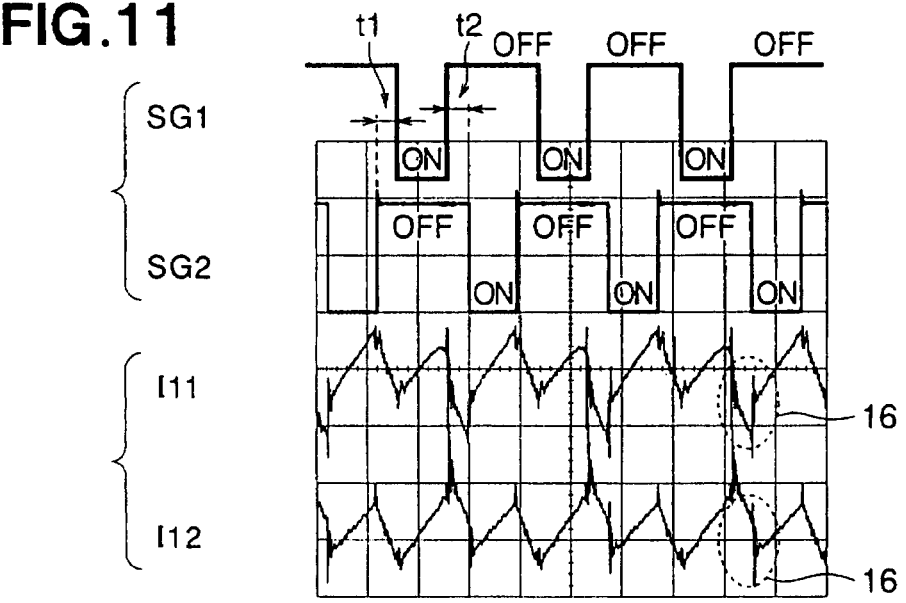
FIG. 11 is a waveform diagram showing waveforms of various circuit components of the DC/DC converter before phase adjustment operation according to the present invention is performed.
Figure 12:
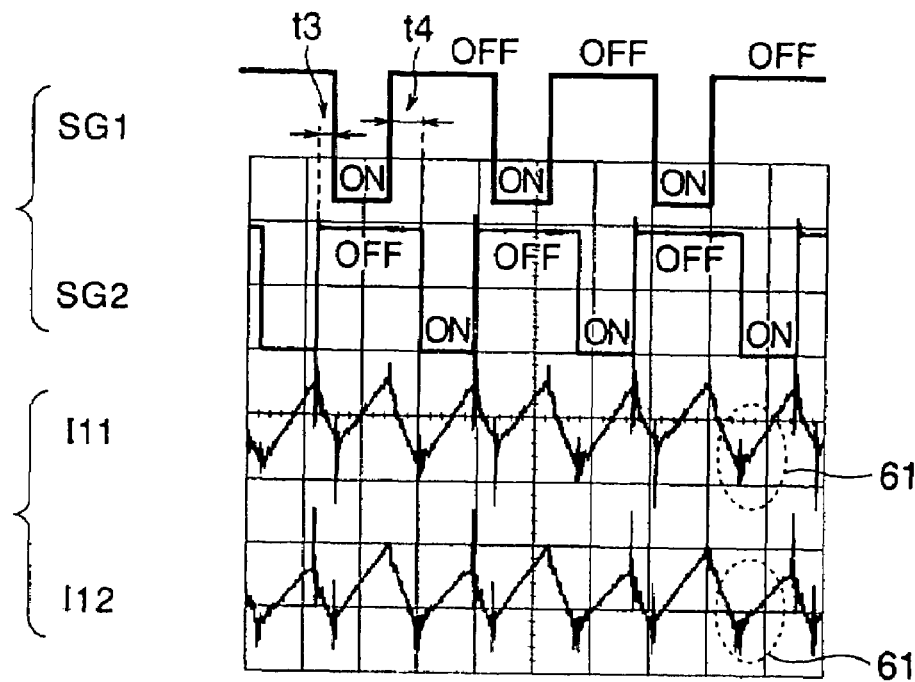
FIG. 12 is a waveform diagram showing waveforms of the circuit components of the DC/DC converter observed when the phase adjustment operation is performed according to the present invention.

FIG. 11 shows waveforms of the gate signals SG1 and SG1 and currents I11 and I12 that are actually observed on the current waveform display 33 before phase control (phase compensation) according to the aforesaid first example is performed by the phase controller 30 in conjunction with the DC/DC converter 10. On the other hand, FIG. 12 shows waveforms of the gate signals SG1 and SG2 and currents I11 and I12 that are actually observed on the current waveform display 33 when the phase control (phase compensation) according to the first example is performed by the phase controller 30. The switching cycle or period employed in the illustrated example is 55 µs.

In the pre-adjustment condition shown in a time period t1 and a time period t2 have the same length and, hence, the currents I11 and I12 involve noticeable waveform discontinuity (stepped portions shown in circles 16). By contrast, in the condition shown in FIG. 12, the time period t1 is slightly decreased (by 3 µs, for example) while the time period t2 is slightly increased (by 3 µs, for example). With this phase adjustment, the currents I11 and I12 are almost free from waveform discontinuity (i.e., current ripple), which would otherwise occur at portions shown in circles 61. By thus shifting the phase of switching operation of the two switching elements SW1 and SW2 based on the gate signals SG1 and SG2, the currents flowing through the primary and secondary windings L1 and L2 of the transformer T1 are substantially freed from waveform discontinuity leading to generation of undue current ripple.

It should be appreciated that the constructions, shapes, positional relationships have been explained above in relation to various examples only to the extent that the present invention can be appropriately understood and carried out, and that the numerical values and materials given above are just illustrative. Namely, the present invention should not be construed as limited to the above-described embodiment and examples and may be modified variously unless it departs from the technical scope indicated by the appended claims.

What is claimed is:

1. A phase control device for use with a voltage-boosting DC/DC converter including a low-voltage-side port and a high-voltage-side port, the DC/DC converter further including a transformer of a magnetic-field cancellation type having a primary winding and secondary winding interconnected in an oppositely-wound configuration with a common terminal of the primary winding and secondary winding being connected to a positive-pole terminal of the low-voltage-side port, first switching means for controlling an energizing current of the primary winding which flows to a common reference terminal, and second switching means for controlling an energizing current of the secondary winding which flows to the common reference terminal, the phase control device comprising:

current detecting means for detecting a current flowing through at least one of the primary and secondary windings;

determining means for, on the basis of a current signal detected by the current detecting means, determining an amount of current ripple occurring when the first switching means or the second switching means switches to an ON state; and phase regulating means for, on the basis of the amount of current ripple determined by the determining means, regulating a phase related to an ON time of each of the first and second switching means such that the amount of current ripple is reduced to zero.

2. The phase control device according to claim 1, wherein the DC/DC converter further includes an inductor connected at one end to the positive-pole terminal of the low-voltage side port and, at the other end, to the common terminal of the primary winding and secondary winding.

3. The phase control device according to claim 1, further comprising a current waveform display electrically connected to the current detecting means for receiving the current signal detected by the current detecting means and displaying a waveform of the detected current signal.

4. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing the relative ratio of C to A while keeping A, B, D and E constant.

5. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing C.

6. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing a part of A which is exclusive of C.

7. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing C in combination with increasing or decreasing of a part of A which is exclusive of C.

8. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing the relative ratio of D to B while keeping A, B, C and E constant.

9. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing D.

10. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing a part of B which is exclusive of D.

11. The phase control device according to claim 1, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing D in combination with increasing or decreasing of a part of B which is exclusive of D.

12. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing the relative ratio of C to A while keeping A, B, D and E constant.

13. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing C.

14. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing a part of A which is exclusive of C.

15. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing C in combination with increasing or decreasing of a part of A which is exclusive of C.

16. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing the relative ratio of D to B while keeping A, B, C and E constant.

17. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing D.

18. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing a part of B which is exclusive of D.

19. The phase control device according to claim 3, wherein when A represents a time period from the leading edge of a turn-on action of the first switching means to the leading edge of a turn-on action of the second switching means, B represents a time period from the leading edge of the turn-on action of the second switching means to the leading edge of the next following turn-on action of the first switching means, C represents the ON time of the first switching means, D represents the ON time of the second switching means, and E represents a switching period which is the sum of A and B, the phase regulating means performs a phase regulating operation by increasing or decreasing D in combination with increasing or decreasing of a part of B which is exclusive of D.

20. A program embodied in a computer readable medium for use in phase control of a voltage-boosting DC/DC converter including a low-voltage-side port and a high-voltage-side port, the DC/DC converter further including a transformer of a magnetic-field cancellation type having a primary winding and secondary winding interconnected in an oppositely-wound configuration with a common terminal of the primary winding and secondary winding being connected to a positive-pole terminal of the low-voltage-side port, first switching means for controlling an energizing current of the primary winding which flows to a common reference terminal, second switching means for controlling an energizing current of the secondary winding which flows to the common reference terminal, the program comprising, and current detecting means for detecting a current flowing through at least one of the primary and secondary windings, the program comprising:
 a determining function to, on the basis of a current signal detected by the current detecting means, determine an amount of current ripple occurring when the first switching means or the second switching means switches to an ON state; and
 a phase regulating function to, on the basis of the amount of current ripple determined by the determining function, regulating a phase related to an ON time of each of the first and second switching means such that the amount of current ripple is reduced to zero.

* * * * *